Aug. 14, 1956  F. L. FAST  2,758,442
HYDRAULIC TRANSMISSION
Filed Feb. 18, 1954  2 Sheets-Sheet 2

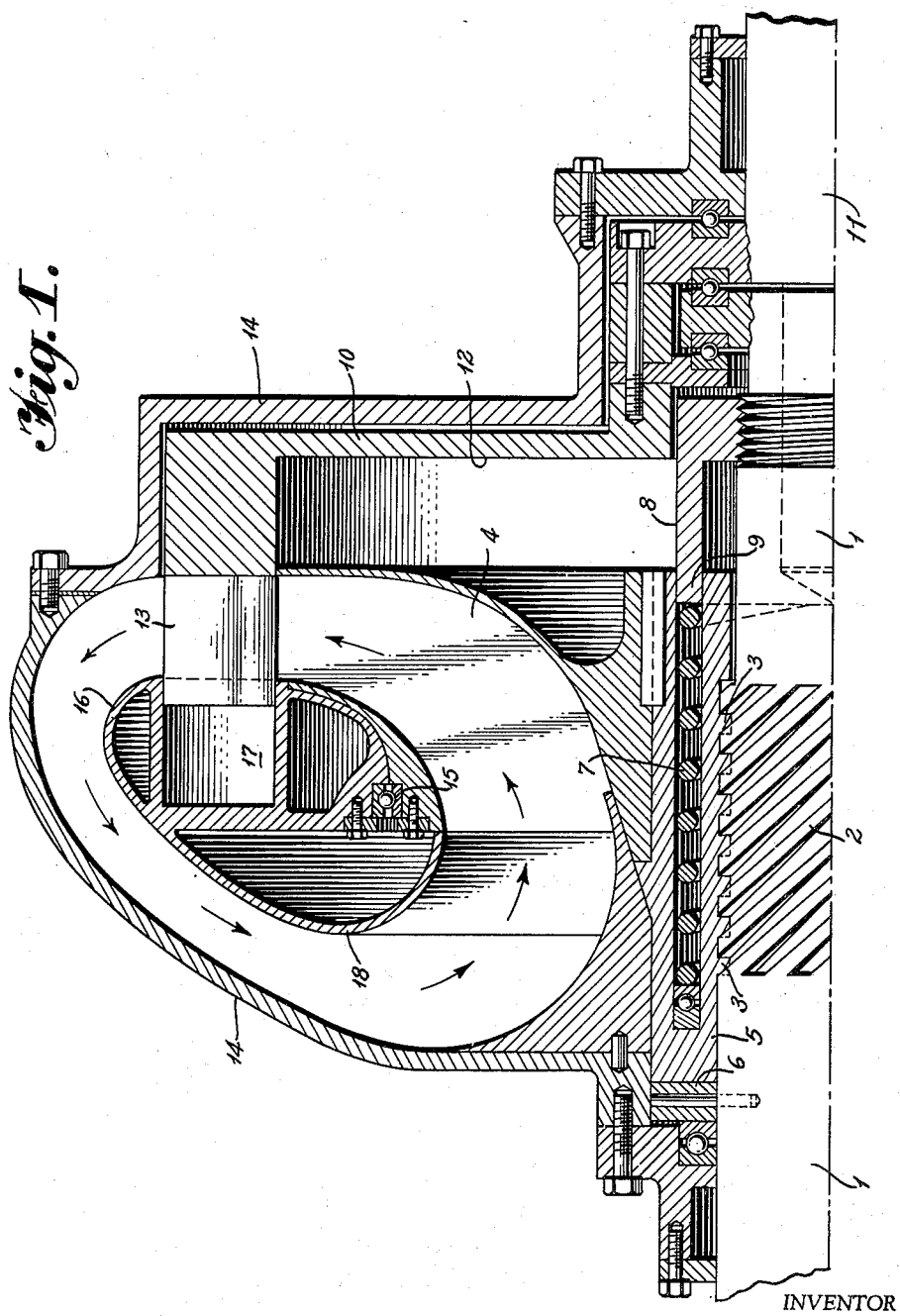

INVENTOR
Fred L. Fast
BY Stevens, Davis, Miller & Mosher
ATTORNEYS 2,758,442
Patented Aug. 14, 1956

United States Patent Office

2,758,442

HYDRAULIC TRANSMISSION

Fred L. Fast, Sewell, N. J.

Application February 18, 1954, Serial No. 411,127

6 Claims. (Cl. 60—54)

This invention relates to a hydraulic torque converter of the type which can be applied to a power plant for the purpose of operating and maintaining the power output therefrom at substantially constant torque while automatically changing the constant torque power supply to conform with varying torque characteristics of power demand, thus giving infinitely variable conversion of torque at all loads. The transmission which constitutes the present invention finds special utility in a power plant of the automotive type.

The transmission relates more particularly to that class of converters in which a driving member consisting of a centrifugal wheel hereinafter referred to as the impeller or centrifugal impeller, is employed to accelerate and maintain in circulation in a closed circuit a hydraulic fluid which in turn strikes against the vanes or blades of a turbine wheel, hereinafter referred to as the rotor, attached to the driven shaft—imparting thereto a rotary motion and thence returns to the impeller inlet to be reaccelerated.

In applying kinetic hydraulic principles to the problem of torque conversion, certain characteristic properties of centrifugal wheels must be taken into account. It will be appreciated that the power output of an engine, such as an internal combustion engine, varies substantially in a linear relationship with its speed of rotation (R. P. M.). On the other hand, the impeller member of a hydraulic torque converter of the type under discussion has an uninhibited characteristic power requirement which varies as the third power of rotative speed. Hence, it is apparent that, if the speed of the internal combustion engine is doubled, its power output will only double. Doubling of the impeller speed, however, will result in its power requirement increasing eight fold. In the usual hydraulic transmissions, the design and relative position of rotor and impeller avoid the impasse which these conditions imply, but at the sacrifice to a degree of both constant torque engine operation and efficient variable torque conversion through the medium of the hydraulic circuit.

With regard to the hydraulic torque converter of the present invention, these non-conforming hydraulic characteristics are employed to realize constant torque engine operation and stepless variable torque conversion in the flow of power through the transmission. As will be fully understood from the following description, means are provided within the converter so that at any speed the torque demand tolerated by the impeller will conform to the optimum power capacity of the engine. The particular means utilized incorporates an automatic control system which governs the hydraulic circuit between impeller and rotor so that the principle of constant torque operation is substantially honored throughout the speed range of the engine. The governing is effected by controlling the volume of hydraulic fluid which the impeller is permitted to discharge, so that impeller torque is substantially constant at any impeller and engine speed.

A second aspect of this situation deals with the combination of an engine, such as a conventional automotive internal combustion engine, driving through the hydraulic torque converter forming the basis of the present invention. It is realized that, at constant engine R. P. M., the engine torque can be varied over a wide range by throttling the quantity of fuel-air mixture admitted to the cylinders. Within this range, there is a point of maximum efficiency in terms of fuel utilization per horsepower generated. This point of maximum efficiency can be said to fall at about 80% of the maximum horse capacity at the given R. P. M. although it will be apparent that this point can only be determined with reference to a specific engine through suitable research. It is also appreciated that the level of power generation, in the case of an internal combustion engine, varies substantially directly with its speed of rotation at any constant throttle setting. Also, at constant throttle setting, the engine torque developed is subtsantially constant although there may be a gradually declining trend in this value at higher engine speeds due to factors involving valve action, flame propagation, etc., which exert their influence in this direction.

With an internal combustion engine of the piston and cylinder type, the factors contributing to engine torque are for the most part constants. The surface area of the piston, the crank arm and the cylinder volume are fixed. The torque generated by the engine is derived from the mean effective pressure exerted by the hot combustion products as expansion takes place in the cylinder. By arranging the torque on the impeller to be regulated to a constant value by the means previously mentioned, a constant mean effective pressure in the engine cylinder is achieved and hence, operation of the engine under the most favorable combustion conditions can be realized.

It is a major object of this invention to provide a novel hydraulic torque converter which will automatically maintain reaction torque on the impeller of the converter at a constant value whereby optimum conditions of engine operation can be realized.

It is a further object of the present invention to provide a novel structure for a hydraulic torque converted which will function to control the volume of fluid pumped by the impeller so that impeller reaction torque is held to a substantially constant value.

It is still a further object of this invention to provide a novel combination of engine and hydraulic torque converter wherein torque on the impeller is retained constant to have a constant mean effective pressure in the cylinder.

Other objects and advantages of this invention and also the preferred manner and structure of accomplishing the desired ends of this invention will become readily known from the description hereinafter when related to the drawings in which:

Figure 1 is a half section through the converter showing the preferred form of the invention;

Figure 3:
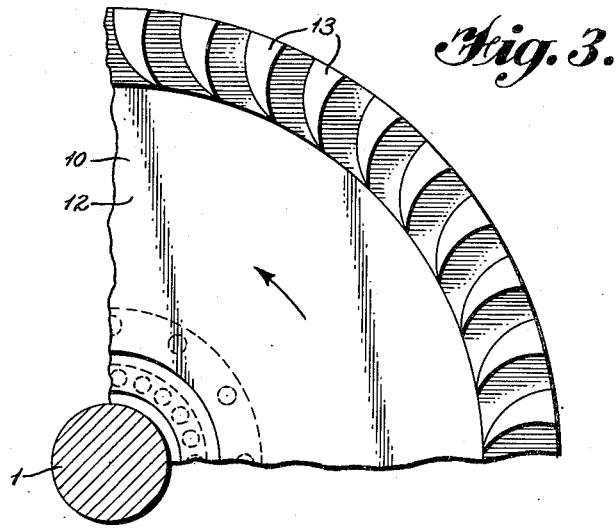
Figure 3 is a fragmentary view in elevation of the rotor as seen looking to the right in Figure 1.

Referring now to the drawing, there is shown a shaft 1 adapted to be rotated by an internal combustion engine (not shown) or any suitable power source. A section of the shaft 1 is turned with a spiral spline 2 which mates with a similar spline 3 forming a part of the bore of centrifugal impeller 4. If desired, the spline 3 may be formed on a distinct element 5, as shown, and the element keyed or otherwise attached to the bore of the centrifugal impeller. The impeller 4 is held against a shoulder 6 locked on shaft 1 by means of a compression spring 7 located in an annular slot cut in the element 5 or base of the impeller. The action of spring 7 is such as to urge or bias the impeller 4 in the direction of the shoulder 6 with a predetermined thrust. The spring is expressly designed to be balanced by a pull on the periphery of the centrifugal rotor of a predetermined amount. In the event the pull on the periphery of the impeller exceeds the balancing force of spring 7, the centrifugal impeller will "unscrew" over the spiral spline 2 and thus move toward the right as shown in the drawing. The other end of the spring 7 is held fixed by a nut 8 which is locked in position by being threaded onto the shaft 1. Nut 8 is provided with a projecting annular rim 9 which registers in the annular slot in element 5 to hold the end of spring 7 fixed irrespective of movement of the impeller 4 to the right.

A rotor 10 is rigidly connected to the transmission output shaft 11. The design of the rotor 10 is such that its face is recessed in the area designated at 12 to allow the impeller 4, when extended to the limit of its travel on the splined section 2 of the input shaft 1, to be received within it. The rotor is provided with blading 13 which registers with the peripheral opening of the centrifugal impeller 4. The components described, namely the centrifugal impeller 4 and the rotor 10, are enclosed within a transmission case 14 which seals against the input and output shafts in a conventional way to prevent loss of fluid. In essence, a closed hydraulic circuit is provided around which fluid can circulate as shown by the arrows. The fluid can be put into motion by rotation of the impeller and be caused to flow through and impinge upon the rotor blading, effecting responsive rotation. The fluid, upon leaving the rotor blading, circulates through the transmission case as indicated to re-enter the centrifugal impeller to be pumped again.

Figure 2:
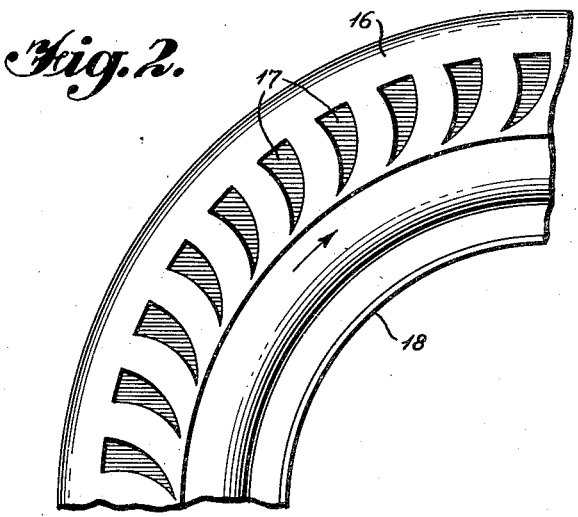
Figure 2 is a fragmentary view in elevation of the shroud ring as seen looking to the left in Figure 1.

Mounted upon the centrifugal impeller 4 by means of ball bearings 15 is a shroud ring composed of a solid ring 16 having suitably shaped recesses 17 (see Figure 2) to receive the rotor blading 13 (see Figure 3) which register therewith and an appropriately curved plate 18 defining the inner boundary of the closed hydraulic circuit. As will be noted from Figure 1, the rotor blading 13 is normally slightly received within the recesses 17. The arrangement of the shroud ring relative to the centrifugal impeller 4 is such that the shroud ring will move axially with the centrifugal impeller 4, but is free to rotate with respect to the impeller by virtue of ball bearing mounting 19. Thus, whenever the pull on the periphery of the centrifugal impeller exceeds the axial bias on the impeller 4 by the spring 7, the impeller 4 will move to the right as mentioned. While in transit, the impeller 4 will carry with it the shroud ring. Thus, the rotor blading 13 will be received deeper into the recesses 17. Since the rotor blading 13 engages the shroud ring through recesses 17, the shroud ring will rotate with the rotor 10 and not the impeller 4. The net result of this arrangement is that the shroud ring will effectually define the active area of the rotor blading upon which the hydraulic fluid impinges and the flow area through the rotor blading. Stated in other words, axial movement of the centrifugal impeller responsive to a pull on the periphery of the impeller different than the equivalent value corresponding to the thrust of spring 7, will be accompanied by a simultaneous change in rotor flow area in the proper direction to correlate the variables of speed of rotation of the impeller and the volume of fluid pumped by the impeller to rebalance or return the pull on the periphery of the impeller to the equivalent value corresponding to the thrust of spring 7. This condition is attained, of course, at a new axial setting of the impeller.

The reaction torque of the centrifugal impeller is determined by the variables of speed of rotation of the impeller and the peripheral discharge opening of the impeller, as defined by the rotor blading. All other factors which contribute to torque on the impeller are of a substantially fixed character, once the impeller has been designed, and, hence, can be considered simply as constants in its design.

When, at any impeller speed, fluid flow issuing from the periphery of the centrifugal impeller exceeds the quantity which will produce the impeller reaction torque or pull equivalent to the spring setting, the impeller will turn on the shaft 1 and move to the right against the spring 7. This comes about because the impeller, under these conditions, tends to lag behind the rotative speed of the input shaft 1 and thus will move axially on the input shaft 1, under the influence of the spiral spline 2 on shaft 1. Such action will result in a reduction in the flow area through the rotor blading 13 due to movement of the shroud ring into the rotor blading, during which movement the shroud ring will be in effect altering the peripheral discharge opening of the impeller. This action will continue until the volume of fluid flow is reduced to that quantity which in terms of power is equivalent to the designed value of torque represented by the thrust of the spring 7. If the impeller torque becomes less than the designed value, the compression of the spring 7 will force the impeller to rotate on the shaft 1 and move to the left, opening additional flow area through the rotor blading until the impeller torque is again balanced by the torque setting of the spring.

It is apparent that the operation of the hydraulic torque converter, as described above, will result in the horse power output of the impeller being matched to the horse power output of the rotor, although bearing no fixed relation thereto in terms of torque forces and rotative speeds. Further, by maintaining a constant torque on the impeller, the resultant effect will be to attain a constant mean effective pressure in the cylinders of the internal combustion engine. The engine can, under these circumstances, operate at the particular constant torque value corresponding to its optimum power to fuel ratio over the entire range of power output. By always observing the optimum power to fuel ratio when operating the engine, savings in fuel will be realized under this arrangement.

In the operation of the device, energy can only be extracted from the fluid by the interference to flow presented by the rotor blading. Unextracted energy in the form of velocity returning to the impeller tends to reduce impeller reaction torque and to increase volume capacity through the rotor. If the resultant power flux under any particular circumstances is in excess of road demand (that power necessary to keep the vehicle moving over a road at a given speed), acceleration of the vehicle can be checked by deceleration of the engine and a new relationship will be automatically established between fluid velocity and quantity handled to transmit energy from impeller to rotor while the engine remains loaded to the preselected torque value at the lower speed.

Due to the construction of the converter, as shown, there may exist a hydraulic unbalance around the rotating impeller which may exert a thrust in the same direction as the spring 7. This being the case, the spring thrust being in part relieved, a spring of less power can be used.

Also, it is possible to employ a hydraulic balancing chamber to function as a means for compensating for hydraulic unbalance around the rotating impeller. Further, the hydraulic unbalance can be used to advantage as the sole means to bring about axial shifting of the impeller or if desired suitable hydraulic means can be utilized to completely replace spring 7. This last-mentioned means may prove exceedingly desirable in some installations since a hydraulic pressure against the impeller can be held to a substantially fixed value with little effort. The precise means to accomplish this end need not be discussed in great detail as many means will no doubt suggest themselves to persons skilled in this art from the above brief discussion and an appreciation of this invention. It will be stated, however, that the thrust producing means on the impeller includes hydraulic means, spring means, and a combination of the two as the determined force against which impeller reaction torque is balanced to control impeller reaction torque induced by hydraulic flow through the impeller.

Another consideration of importance is the variation in thrust on the impeller over its speed range due to the character of the thrust producing means, i. e., spring 7. Compensation for variations of this type can be made in a number of modes. For example, the use of a varying pitch in spiral spline 2 over which the impeller is guided in axial movement can be employed. Where pitch variation proves of benefit, the impeller mating member could conveniently be of a "point" type, as for instance, through the agency of a series of rollers or balls which would furnish engagement of the impeller and input shaft on a plane normal to their axes.

Reviewing summarily the foregoing presentation, the structure shown and described varies the physical dimensions of the channels between the rotor blades to give a low clearance adapted to high velocity-low volume conditions of fluid flow, or high clearance adapted to high volume-low velocity conditions of fluid flow. It is thus apparent that this arrangement adapts the rotor to conditions of power transmission ranging from low speed-high torque to high speed-low torque. Engine torque, however, is held constant by the action of the impeller which, when generating torque exceeding in equivalent value that set for engine operation, reduces the volume of fluid flow by controlling the clearance through the rotor blades. Acceleration of the engine speed is then necessary to increase the power flux which it will be realized is a function of the increased dynamic head and lower fluid flow. In the event the impeller generates a torque less than the established value, the impeller is forced by spring thrust in the direction of increased fluid flow which again will have the effect of bringing torque reaction back into balance with spring compression.

Although the present invention has been shown and described with reference to a preferred embodiment, nevertheless, various changes and modifications obvious to one skilled in the art are within the spirit, scope and contemplation of this invention.

What is claimed is:

1. A hydraulic torque converter comprising an impeller adapted to pump a hydraulic fluid, a rotor having blading associated with said impeller in a manner that the fluid pumped by said impeller impinges upon the blading of said rotor imparting rotary motion thereto, means for returning fluid issuing from said rotor to said impeller, and control means responsive to variations of impeller torque from a predetermined value to vary the flow area through the blading of said rotor to readjust said impeller torque to said predetermined value.

2. A hydraulic torque converter comprising an input shaft, an impeller mounted for rotation with said input shaft, an output shaft, a rotor having blading mounted on said output shaft and associated with said impeller in a manner that the fluid pumped by said impeller impinges upon the blading of said rotor imparting rotary motion thereto, means for returning fluid issuing from said rotor to said impeller, means for shifting said impeller relative to said rotor, and means to vary the flow area through the blading of said rotor responsive to shifting of said impeller relative to said rotor.

3. A hydraulic torque converter comprising an input shaft, an impeller mounted for rotation with said input shaft, an output shaft, a rotor having blading mounted on said output shaft and associated with said impeller in a manner that the fluid pumped by said impeller impinges upon the blading of said rotor imparting rotary motion thereto, means for returning fluid issuing from said rotor to said impeller, means for shifting said impeller relative to said input shaft, and means carried by said impeller to vary the flow area through the blading of said rotor responsive to shifting of said impeller relative to said rotor.

4. A hydraulic torque converter comprising an input shaft, an impeller mounted for rotation with said input shaft, an output shaft, a rotor having blading mounted on said output shaft and associated with said impeller in a manner that the fluid pumped by said impeller impinges upon the blading of said rotor imparting rotary motion thereto, means for returning fluid issuing from said rotor to said impeller, a spiral spline on said input shaft, a spiral spline on said impeller mating with said first-mentioned spiral spline whereby said impeller is adapted to unwind through the agency of said splines thereby effecting axial shifting of said impeller relative to said input shaft, means exerting a predetermined thrust on said impeller tending to force same to one extreme position relative to said input shaft, and means carried by said impeller to vary the flow area through the blading of said rotor responsive to shifting of said impeller relative to said input shaft.

5. A hydraulic torque converter comprising an input shaft, an impeller mounted for rotation with said input shaft, an output shaft, a rotor having blading mounted on said output shaft and associated with said impeller in a manner that the fluid pumped by said impeller impinges upon the blading of said rotor imparting rotary motion thereto, means for returning fluid issuing from said rotor to said impeller, a spiral spline on said input shaft, a spiral spline on said impeller mating with said first-mentioned spiral spline whereby said impeller is adapted to unwind through the agency of said splines thereby effecting axial shifting of said impeller relative to said input shaft, means exerting a predetermined thrust on said impeller tending to force same to one extreme position relative to said input shaft, and a shroud ring carried by said impeller adapted to cooperate with the blading of said rotor to vary the flow area therethrough responsive to shifting of said impeller relative to said input shaft.

6. A hydraulic torque converter as defined in claim 5 wherein said means to exert a predetermined thrust on said impeller is characterized by a spring.

References Cited in the file of this patent

UNITED STATES PATENTS

| 2,024,698 | McDougall | Dec. 17, 1935 |
| 2,391,413 | Gregg | Dec. 25, 1945 |
| 2,471,179 | Wemp | May 24, 1949 |
| 2,587,154 | Hartz | Feb. 26, 1952 |
| 2,623,407 | Mayner | Dec. 30, 1952 |
| 2,627,164 | Halpern | Feb. 3, 1953 |